Figure 1:
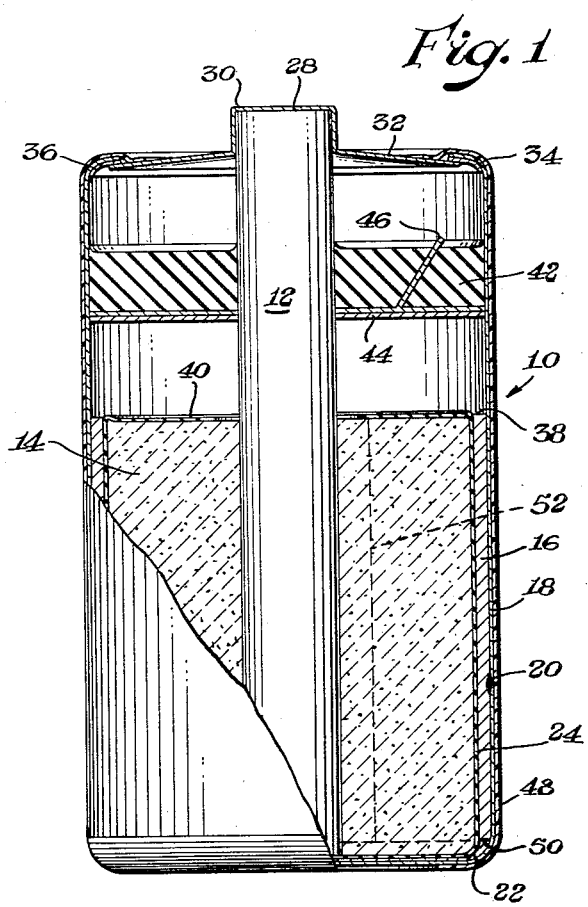

Sept. 2, 1958     R. C. KIRK ET AL     2,850,557

MAGNESIUM ANODE PRIMARY CELL

Filed Aug. 8, 1955

INVENTORS.
Roy C. Kirk
Raymond W. Reid

BY Griswold & Burdick
ATTORNEYS

United States Patent Office 2,850,557
Patented Sept. 2, 1958

2,850,557

MAGNESIUM ANODE PRIMARY CELL

Roy C. Kirk, Sanford, and Raymond W. Reid, Midland, Mich., assignors to The Dow Chemical Company, Midland, Mich., a corporation of Delaware Application August 8, 1955, Serial No. 526,912

4 Claims. (Cl. 136—100)

This invention relates to an improved primary cell of the dry or nonspillable type, and particularly to dry cells in which the anode material is magnesium.

Dry cell formulations employing magnesium as the anode material are disclosed in a paper by R. C. Kirk and A. B. Fry, "Magnesium dry cells," published in the "Journal of the Electro-chemical Society," vol. 94, No. 6, pages 277 to 289, inclusive.

In making up magnesium primary cells, as mentioned in U. S. Patent No. 2,616,940, "the usual procedure is to form the anode material into a cup or 'battery can' which constitutes one of the electrodes of the cell as well as the container holding the cathode elements and the electrolyte. The cathode mix consists of manganese dioxide having intimately mixed with it usually between about 5 and 15 percent of finely divided carbon, such as acetylene black, by weight. The mixture is moistened with enough electrolyte to make it moldable and the moldable mixture is formed into 'bobbins' around a central electrode in the form of a rod of carbon or graphite. These bobbins are usually cylindrical moldings somewhat smaller than the battery can and are inserted into the cans after the cans are lined with starch paste or gelled electrolyte or a porous nonconductor, such as cloth or paper, to keep the bobbin from touching the can. In some instances the cathode mix is introduced into the lined cans without previously forming the cathode mix into a bobbin, the molding taking place in the lined can. In such instances, after placing the cathode mix in the can, the carbon or graphite rod is pushed centrally into the cathode mix as the other electrode."

Similar dry cell formulations are disclosed in U. S. Patent 2,547,907 and 2,547,908. U. S. Patent 2,616,940 discloses that in the cells having the foregoing formulations the can or lining may be dispensed with and the cathode mix may be placed directly against the inside of the can or cup in assembling the cell elements.

Dry cells formulated as above described (with or without lining the can) are usually sealed at the top. Sealing is accomplished by placing a cardboard or similar porous dielectric washer in the top of the can over the end of the carbon rod a short distance above the cathode mix. Then a layer of sealing compound, such as a rosin-base sealing wax, coal tar or asphalt pitch, is poured over the washer so as to fill the annular space at the top of the can above the washer.

While dry cells made in the above described manner give excellent performance, they are not of the so-called leak proof variety which are in wide demand as flashlight batteries. Also the use of a magnesium cup anode is un-economical from the standpoint of the bobbin size and amount of electrolyte contained in the cell. That is, because the anode cup walls are heavy enough to permit the anode to be the container of the cell, an un-balance of materials exists because the can or cup anode of the flashlight cell cannot hold enough cathode mix and electrolyte to completely consume a cup-shaped extruded anode during the useful life of the cell.

A principal object of this invention is to provide an improved dry cell of the so-called leak-proof variety which has a long useful life, high output voltage and efficiency, and is economical to manufacture. In accordance with this invention, there is provided a primary cell comprising a steel cup or container having a tubular-shaped magnesium anode therein. The anode is in direct contact with and is welded to the steel can. A cathode electrode, insulated from the steel can, is centrally disposed within the cell. Cathode mix and electrolyte fill the space between the cathode electrode and the anode. The cathode mix, however, is separated physically from direct contact with the anode by a porous non-conducting layer.

Figure 2:
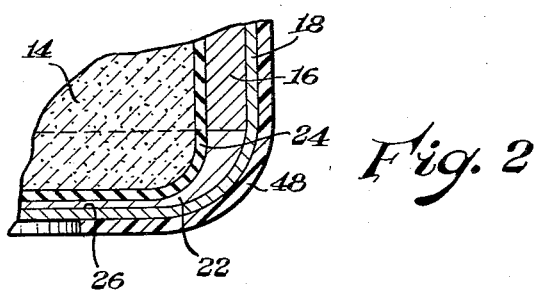

The invention, as well as additional objects and advantages thereof, will best be understood when the following detailed description is read in connection with the accompanying drawings, in which;

Fig. 1 is a side elevational view, partly in section, of a primary cell made in accordance with this invention, and Fig. 2 is a fragmentary view, on an enlarged scale and in section, of the lower part of the cell shown in Fig. 1.

Referring to the drawings, there is shown a primary cell, indicated generally by the numeral 10, comprising a cathode electrode 12, cathode mix 14 including electrolyte, and a tubular shaped magnesium anode 16 encased in a steel can 18 which conveniently may be a drawn steel can. The anode 16 is in direct contact with the can 18 and is welded to the can, as at 20, in at least one place.

The bottom of the can 18 is coated with an insulating material 22, such as grease, oil, or lacquer. The cathode mix 14 is contained in a paper separator bag 24 which fits within the anode 16 and rests on the insulating material at the bottom of the can 18. The cathode electrode 12, which is a carbon or graphite rod within the bag 24, is axially disposed with respect to the can 18. The lower end of the electrode rod 12 lies against the bottom of the paper bag 14, and is insulated from the bottom 26 of the can or cup 18 by the bag 24, and the coating 22 of grease, oil, or lacquer.

The top 28 of the cathode terminal electrode 12 extends above the top of the steel can 18 and is held in position by a somewhat hat-shaped cover plate 30 whose periphery or "brim" 32 extends to and is insulated from the turned in upper end 34 of the steel can 18. Insulation between the can 18 and cover plate 30 is provided by a paper ring or annulus 36 which separates the two parts.

The magnesium anode 16 extends about ⅔ of the length of the steel can 18.

The cathode mix 14 extends between the carbon rod 12 and the anode 16. The mix 14 is in direct contact with the carbon rod 12, but is separated from direct contact with the anode 16 by the paper bag 24 in which the mix is contained. The cathode mix 14 extends to or near to the top 38 of the anode 16, and the upper wall 40 of the paper separation bag 24 is turned in towards the carbon rod 12 to help prevent the spilling of cathode mix 14 directly onto the anode 16.

A tar seal 42 is provided between the carbon rod 12 and the steel cup 18. An apertured paper washer 44 is fitted between the carbon rod 12 and the can 18 to provide the base on which the tar seal 42 is poured. A paper tab 46 extending upwardly from the washer 44 through the tar seal 42 provides the means by which gas generated within the cell 10 while current is drawn therefrom is vented to the upper portion of the cell which is not sealed in a gas tight manner. Alternatively, a porous carbon rod 12 may be used to vent gases from the cell. In such cases the cover plate 30 usually contains a small aperture adjacent to the rod 12. The volume between the top of the anode 16 and the seal 42 is customarily provided because gases may be generated within the cell at a faster rate than they may be vented through the tab 46. The additional space between the tar seal 42 and the cover plate 30 is provided in order that a specific cell dimension may be maintained, e. g., a standard length flashlight cell as established for zinc anode type cells.

In order that two or more of the cells 10 will not short out when connected in series in a metal cased flashlight, an insulating plastic coating 48 is provided on the side walls and part of the ends of the can 18. It should be emphasized that the insulating coating may be dispensed with if the cells are to be used in parallel or even if connected in series if the cells are used in an electrically non-conductive container.

Formulations of suitable electrolytes and dry mixes for dry cells having magnesium for the anode material are disclosed in the aforementioned U. S. Patents 2,547,907, 2,547,908, 2,606,940, and paper by Kirk and Fry.

The anode 16 in a specific cell made in accordance with this invention is composed of AZ31A alloy sheet of .030 wall thickness rolled to form a cylinder 1.25 inches in diameter and 1.5 inches high. In addition to magnesium, AZ31A alloy contains nominally 3 percent aluminum, 1 percent zinc and about .15 percent calcium. The anode cylinder 16 fits closely within the drawn steel can 18 with the bottom edge 50 of the anode 16 at or near to the bottom 26 of the can 18. Although the anode 16 fits closely within the steel can or cup, a friction fit connection between the anode 16 and the cup 18 is not relied upon to provide a low resistance contact between the two parts. The anode 16 is preferably welded (spot welded, for example) to the can 18 at least at one point, the location of the weld 20 being about midway between the ends of the anode 16. Usually 3 welds, spaced approximately symmetrically around the anode 16, are used. The edges of the anode sheet which are in juxtaposition with each other are usually separated by .005 inch or less in order to prevent an excessive amount of electrolyte from passing between the juxtaposed edges (shown as the dotted line 52 in Fig. 1) and being dispersed between the anode 16 and the cup 18.

If the spacing between the juxtaposed edges exceeds about .005 inch it is usually advisable to apply across the edges 52 a tape which restricts the flow of electrolyte therethrough. Cellophane tape, polyethylene tape and friction tape are examples of suitable tapes of both porous and non porous types.

It has been found that the weld area of the anode 16 is apparently cathodic with respect to the remainder of the anode 16 and thus is cathodically protected by the remainder of the anode. Good electrical contact is thus maintained between the anode and the steel cup until the anode is substantially completely consumed. Further, the magnesium anode cathodically protects the sides of the steel can from corrosion and possible puncturing by the electrolytic action. As previously mentioned, the bottom 26 of the steel can 18, which serves as the anode terminal electrode, is protected from corrosion due to electrolytic action by a coating of oil, grease or lacquer which extends over the bottom (inside) of the can 18. The bottom of the paper bag containing the cathode mix, electrolyte, and carbon rod supplements the grease or oil coating in preventing electrical contact between the carbon rod and the steel cup.

Thus primary cells made in accordance with this invention are leak proof, make efficient use of the anode material to provide a long useful life, and are economical to manufacture.

We claim:

1. A primary cell comprising a one piece steel cup which is a terminal electrode of said cell, a hollow cylindrically shaped magnesium anode, said anode being telescoped within and in close fitting relationship with respect to said cup, said anode being directly welded to said cup, a carbon cathode disposed in the cup with one end projecting outwardly of the cup beyond the rim, said cathode being electrically insulated from said cup, a cathode depolarizing mixture comprising manganese dioxide and carbon black moistened with an aqueous electrolyte, the said mixture being interposed between the inside of the cup and the carbon cathode below the rim of the cup, a gas impermeable seal, said seal extending between the carbon cathode and said steel cup above said anode, and means for venting gases generated within said cell during its operation.

2. A primary cell comprising a one piece steel cup which is a terminal electrode of said cell, a hollow cylindrically shaped magnesium anode, said anode being telescoped within and in close fitting relationship with respect to said cup, said anode having a welded connection to said cup, a carbon cathode disposed in the cup with one end projecting outwardly of the cup beyond the rim, said cathode being electrically insulated from said cup, a cathode depolarizing mixture comprising manganese dioxide and carbon black moistened with an aqueous electrolyte, the said mixture being interposed between the inside of the cup and the carbon cathode below the rim of the cup, a washer of porous dielectric material encircling the carbon cathode and above the depolarizing mixture, the outer periphery of the washer being against the inside of the cup and the inner periphery against the carbon cathode, the said washer having a tab formed integrally therewith and projecting upwardly, and a moldable sealing compound molded in situ upon the outside of the washer forming a top seal for the cell between the sides of the carbon electrode and cup and encircling the said tab, said tab projecting through the sealing compound and forming a gas permeable passageway through the sealing compound for venting the hydrogen generated in the cell.

3. A primary cell comprising a drawn steel cup which is a terminal electrode of said cell, a cylindrically shaped magnesium anode made of sheet stock, said anode being telescoped within and in close fitting relationship with respect to said cup, said anode having a welded connection to said cup, a carbon cathode disposed in the cup with one end projecting outwardly of the cup beyond the rim, said cathode being electrically insulated from said cup, a cathode depolarizing mixture comprising manganese dioxide and carbon black moistened with an aqueous electrolyte, the said mixture being interposed between the inside of the cup and the carbon cathode below the rim of the cup, a washer of porous dielectric material encircling the carbon cathode above the cathode depolarizing mixture, the outer periphery of the washer being against the inside of the cup and the inner periphery against the carbon cathode, the said washer having a tab formed integrally therewith and projecting upwardly, and a moldable sealing compound molded in situ upon the outside of the washer forming a top seal for the cell between the sides of the carbon electrode and cup and encircling the said tab, said tab projecting through the sealing compound and forming a gas permeable passageway through the sealing compound for venting the hydrogen generated in the cell.

4. A primary cell in accordance with claim 3, wherein the material composing said anode and said cathode mix are chemically balanced whereby substantially the entire anode is consumed during the life of said cell.

References Cited in the file of this patent

UNITED STATES PATENTS

| | | |
|---|---|---|
| 905,952 | Szek | Dec. 8, 1908 |
| 1,352,834 | Ruhoff | Sept. 14, 1920 |
| 2,198,423 | Anthony | Apr. 23, 1940 |
| 2,399,089 | Anthony | Apr. 23, 1946 |
| 2,474,716 | Beechlyn | June 28, 1949 |
| 2,490,598 | Oliver | Dec. 6, 1949 |
| 2,697,738 | Glesner | Dec. 21, 1954 |